United States Patent Office 3,465,228
Patented Sept. 2, 1969

3,465,228
PULSE WIDTH CONTROL FOR ADJUSTABLE
SPEED DRIVE SYSTEM
James Long and Niels P. Pedersen, Erie, Pa., assignors to
General Electric Company, a corporation of New York
Filed May 19, 1967, Ser. No. 639,899
Int. Cl. H02k 27/20; H02p 5/46
U.S. Cl. 318—328                                    3 Claims

ABSTRACT OF THE DISCLOSURE

Relates to an analog-to-digital converter for the feedback loop of an adjustable speed drive system in which a precision width pulse is produced in response to each cycle of an alternating-current tachometer signal. The duration of each precision width pulse is equal to the duration of a predetermined number of cycles of a signal produced by a crystal oscillator.

Background of the invention

This invention relates to adjustable speed motor drive systems, and more particularly, to speed regulators for such systems.

Many applications of adjustable speed drive systems require a highly accurate regulation of the speed of drive motors controlled by the systems. For example, the actual speed of a drive motor may not be allowed to deviate by any more than 0.1% from a desired speed.

The same highly accurate regulation of speed must be maintained throughout the wide variations in the ambient temperature of drive systems which occur in the many industrial, military and mining applications of these drive systems.

Many conventional adjustable speed drive systems include a speed regulator comprising a reference signal source which produces a speed reference signal having an average voltage level which is proportional to the desired speed of the drive motor. A feedback circuit provides a feedback signal having an average voltage level which is proportional to the actual speed of the drive motor. The energization of the drive motor is varied as a function of the difference between the average voltage levels of the speed reference signal and the feedback signal to vary the torque, and as a result the speed, of the motor itself. Conventional, relatively inexpensive voltage regulating circuits can be used to accurately maintain a desired average voltage level of the speed reference signal. A direct-current tachometer generator, coupled directly to the drive motor itself or coupled to a driven load of the system, is often used as a convenient means for developing feedback signals proportional to the speed of the motor. However, the cost of these direct-current generators increases substantially when they are required to have a high degree of accuracy. Therefore, alternate means have been sought to produce highly accurate feedback signals.

The frequency of the output signals of an alternating-current generator is always exactly proportional to the speed of its rotor. When a rotor of an alternating-current generator is coupled to a drive motor, the frequency of the alternating-current output signal of this generator is exactly proportional to the speed of the drive motor. The occurrence of successive cycles of the alternating-current output signal thus provides a digital measurement of the exact speed of the driven motor. However, apparatus must also be provided for converting this digital measurement of the motor speed into an analog signal, having an average voltage level proportional to the motor speed, for comparison with the speed reference signal in a conventional drive system of the type referred to above. The apparatus which converts the digital measurement of the motor speed to an analog signal must have the same high degree of accuracy and stability required of the drive system.

Apparatus of this type has attempted to produce the required analog signal by generating a constant voltage level, precision width pulse during a portion of each cycle of the alternating-current signal frequency. Experience has shown that the voltage level of these pulses can be accurately controlled in a satisfactory manner through the use of voltage regulators using conventional breakdown voltage devices. However, the width of these pulses has often been controlled through the use of timing circuits using energy storage devices, such as capacitors, or other apparatus which is subject to thermal instability unless it is subjected to costly close inspection and testing during manufacturing.

Therefore, it is a general object of this invention to provide an adjustable speed drive system in which the speed can be very accurately regulated through the use of a feedback circuit which is relatively inexpensive to manufacture.

It is another object of this invention to provide an adjustable speed drive system which uses a relatively inexpensive feedback circuit, including an alternating-current tachometer, to provide highly accurate speed regulation over a wide range of drive system ambient temperature changes.

Brief summary of the invention

Briefly stated, and in accordance with one aspect of this invention, in an adjustable speed drive system of the type described above, means including a stable frequency source and a counter circuit, which produces a precision width pulse having a duration equal to a predetermined number of cycles of the signal from the stable frequency source, are combined with an alternating-current tachometer coupled to a drive motor. A trigger signal actuates the counter circuit during each cycle of the alternating-current tachometer. Means are provided for terminating the trigger signal upon the occurrence of each precision width pulse.

The novel features believed to be characteristic of this invention are set forth with particularity in the appended claims. The organization and manner of operation of the invention, together with further objects and advantages thereof, may be best understood by reference to the following description, taken in conjunction with the accompanying drawings in which:

Figure 1:
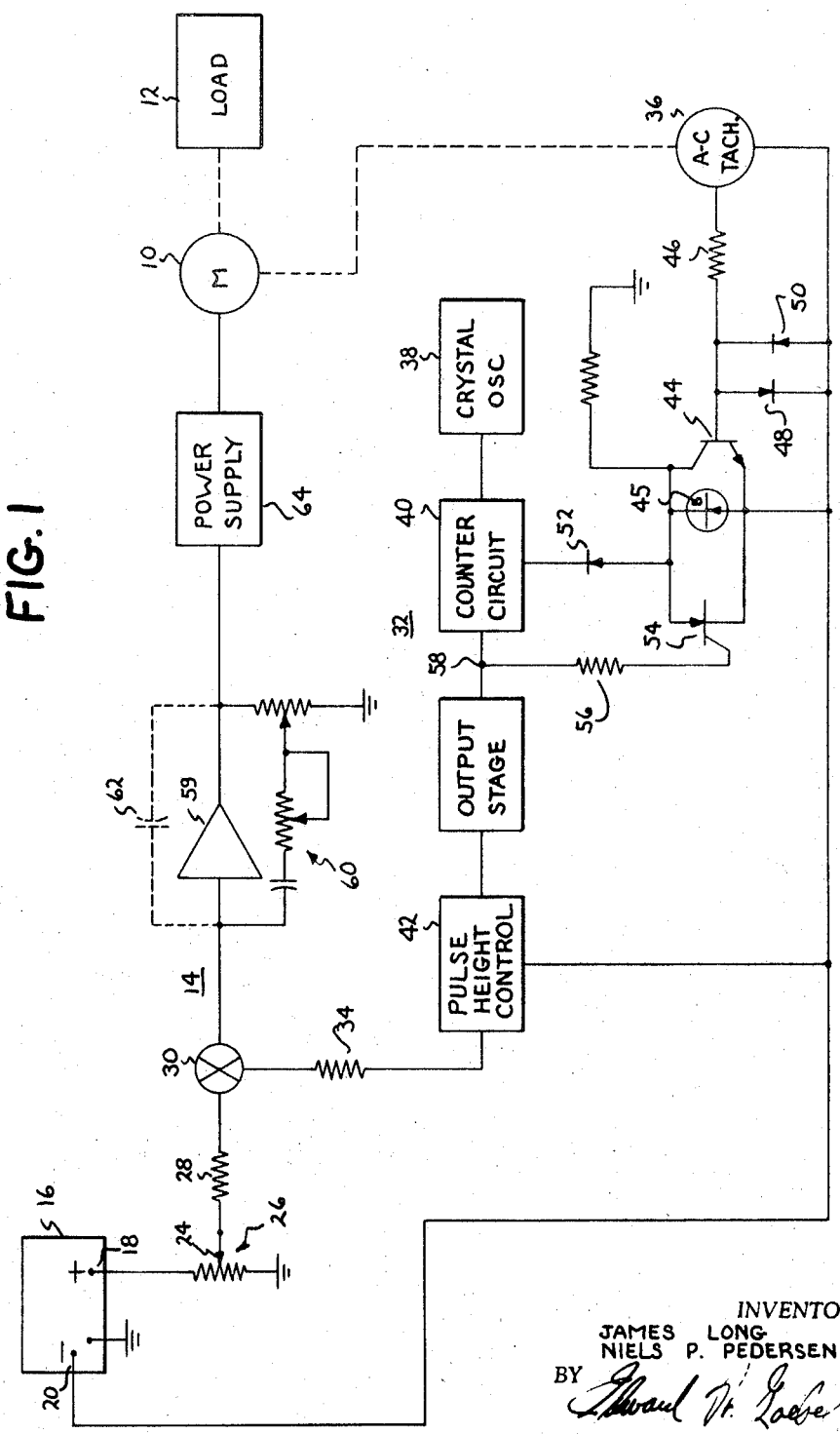
FIG. 1 is a schematic circuit diagram of an adjustable speed drive system embodying this invention.

FIG. 1 shows a conventional, adjustable speed drive system having a speed-responsive feedback circuit which is made in accordance with this invention. In this system, a drive motor 10 provides torque which rotates a load device 12 in response to error signals provided by a regulator 14. A reference signal source 16 provides a speed reference signal having an average voltage level proportional to a desired speed of the motor 10. The speed reference source provides regulated voltages at terminals 18 and 20 through the use of conventional regulating devices such as Zener diodes and other voltage breakdown devices.

The reference signal source 16 provides a voltage at the terminal 18 which is positive in polarity with respect to a common terminal 22. This positive polarity voltage is coupled through a slide wire 24 of a potentiometer 26 and through a resistor 28 to a summing junction 30. The position of the slide wire 24 is adjusted to provide the voltage level at the junction 30 which is proportional to the desired speed of the motor 10. This voltage level is compared with the average voltage level of feedback signals coupled from a feedback circuit 32 and through a resistor 34 to the junction 30. An error signal resulting from the comparison of the speed reference signal and the feedback signal varies the energization of the motor 10 to adjust the output torque, and as a result the speed, of this motor.

The reference signal source 16 may comprise the regulated power supply and potentiometer shown in FIG. 1, or it may comprise any other convenient means for generating reference signals having voltage magnitude proportional to the desired speed of the motor 10. For example, it may comprise a tachometer generator which is driven by a master drive system. The command source may also include a computer or acceleration timing circuit, with the analog output signals of either of these being the reference signals.

The feedback circuit 32 includes means for providing alternating-current signals having a frequency proportional to the actual speed of the motor 10. In the illustrated embodiment, this means comprises an alternating-current tachometer generator 36 which is mechanically coupled to the motor 10. The occurrence of each cycle of the alternating-current signal from the tachometer 36 provides a digital-type measurement of the speed of the motor 10. The remaining portion of the feedback circuit 32 basically comprises a digital-to-analog converter which allows this very exact tachometer measurement of the speed to be converted to a signal which can be used in an otherwise conventional adjustable speed motor drive system.

In accordance with the principles of this invention, the feedback cricuit 32 comprises means for combining the alternating-current tachometer 36, or other similar apparatus, with a stable frequency source 38 and a trigger controlled counter circuit 40 to produce a precision width pulse having a pulse width equal to the duration of a predetermined number of cycles of a signal produced by the stable frequency source. This precision width pulse is then processed by means 42 for providing successive pulses with a constant voltage level. One of these constant width and constant height pulses occurs in response to each cycle of the signal produced by the alternating-current tachometer 36. The average value of the voltage produced by these pulses over the length of any cycle of the voltage from the tachometer 36 is proportional to the speed of the motor 10. While the pulses themselves are compared with the direct-current speed reference signal at the junction 30, the time constants in the remaining portion of the adjustable speed drive system integrate the "error" signals produced by this comparison to effectively average the voltage produced by each pulse over an entire cycle of the alternating-current signal from the tachometer 36.

The error signal produced by the regulator 14 is amplified by a high gain amplifier 59 having an adjustable feedback network 60 connected thereacross. The network 60 responds to high frequency signals which occur during transient operating conditions of the drive system, thereby stabilizing the system. Further stabilization may be provided by coupling the capacitor 62 across the amplifier 59. The amplified error signal causes a power supply 64, such as a D-C generator, or a static power supply comprising, for example, silicon controlled rectifiers, which varies the energization of the motor 10. In a typical D-C adjustable speed drive motor system the armature voltage of the motor can be varied in accordance with the output of the power supply 64 to vary the torque, and thus as a result the speed, of the motor.

To combine the alternating-current tachometer with the counter circuit 40, means are provided for producing a trigger signal for the counter circuit during each cycle of the alternating-current signals from the tachometer 36. These means comprise a transistor 44, having a base and emitter circuit biased by the alternating-current signals from the tachometer 36, and a breakdown voltage device 45 connected across the collector and emitter electrodes of the transistor 44. A resistor 46 is connected between the tachometer 36 and the base electrode of the transistor 44, while a pair of diodes 48 and 50 are connected across these electrodes to clip the alternating-current tachometer signals and prevent damage to the transistor 44. Trigger signals are coupled through a diode 52, at the collector electrode of the transistor 44, to the counter circuit 40.

During the positive half-cycle of the alternating-current tachometer signal, the transistor 44 is turned on. This transistor shorts the anode of the diode 52 through its emitter and collector electrodes to the negative supply voltage supplied from the terminal 20 of the regulated voltage supply 16. No trigger pulse is generated at this time.

During a negative half-cycle of the alternating-current tachometer signals, the transistor 44 is turned off. The diode 52 is forward biased by the voltage developed at this time across the breakdown voltage device 45 and thus couples a trigger signal to the counter circuit 40. A controlled rectifier 54, such as a silicon controlled rectifier, is forward biased as well by the voltage across the breakdown voltage device 45. The gate electrode of the controlled rectifier 54 is coupled through a resistor 56 to the output terminal of the counter circuit 40.

The stable frequency oscillator source 38 is shown, for illustrative purposes, to be a crystal controlled oscillator of the type which provides periodic signals having a constant frequency regardless of changes in its ambient temperature. Crystal controlled oscillator circuits of this type are well known in the art and thus will not be further described. However, other stable frequency sources, such as atomic operated clocks, may be used in place of the crystal controlled oscillator if desired.

The counter circuit 40 is of the type which begins its output signal upon the coincidence of a trigger signal, say from the diode 52, and a preselected portion of a periodic signal of the type produced by the oscillator 38. The counter circuit maintains this output signal for a time duration equal to the length of a predetermined number of cycles of the periodic signals from the oscillator. Thereafter, there is no output signal from this counter circuit 40 until another trigger signal activates the control circuit and enables it to respond once again to the occurrence of the preselected portion of the periodic signal from the oscillator 38.

The feedback circuit further includes means comprising the silicon controlled rectifier 54 which terminates the trigger pulse upon the occurrence of the precision width pulse from the counter circuit 40. When the first portion of the precision width pulse is present at a junction 58 at the output of the counter circuit 40, the gate electrode of the silicon controlled rectifier 54 is energized, turning on this controlled rectifier. At this time the anode electrode of the diode 52 is shunted to the negative voltage from the terminal 20 to reverse bias this diode and terminate the trigger signal. Thus, through the use of the circuit configuration shown, each cycle of the alternating-current signal from the tachometer 36 produces a single trigger pulse which causes the counter circuit to produce a precision width pulse having a duration equal to the predetermined number of cycles of the periodic signal generated by the crystal oscillator 38. This precision width pulse is generated through the use of circuit components which do not change its width in response to changes in the ambient temperature of the adjustable speed drive system.

Furthermore, since the controlled rectifier 54 is turned on to terminate the trigger pulse, and remains on while the tachometer 36 generates a signal which forward biases this controlled rectifier, no transient voltage can initiate the generation of another precision width pulse once the trigger pulse is terminated. This prevents the accidental generation of more than a single precision width pulse as long as the controlled rectifier 54 is forward biased. During the next half-cycle of the signal from the tachometer 36 the transistor 44 is forward biased, preventing the generation of a trigger pulse which might enable the counter once again. The signal from the alternating-current tachometer 36 must forward bias the breakdown voltage device 45 once again, after the controlled rectifier 54 has become non-conducting, to generate another trigger pulse.

The frequency of the crystal controlled oscillator 38 must be such that at the highest speed of the motor 10 the duration of the predetermined number of cycles of the periodic oscillator signal is less than the duration of a cycle of the alternating-current signal from the tachometer 36. That is, a cycle of the alternating-current signal should not terminate before the precision width pulse itself has terminated, thereby preventing overlapping precision width pulses which would give a false resulting analog signal at the junction 30. Assuming that the same tachometer is used, the oscillator 38 must have a higher frequency as the maximum speed of the drive motor 10 increases.

From a practical standpoint, in the illustrated embodiment of this invention, the duration of an alternating-current signal cycle from the tachometer 36 must be equal to the duration of at least one more than the predetermined number of cycles of the periodic oscillator signal. Since the crystal oscillator 38 in a free-running oscillator, the start of an alternating-current cycle from the tachometer 36 is not synchronized with the start of a cycle of the periodic signal from the oscillator, or with whichever portion of the periodic signal to which the counter circuit 40 responds. Therefore, once a trigger signal is generated in response to a signal from the tachometer 36, the counter circuit 40 must be allowed a cycle of the periodic signal to begin generating the precision width pulse.

Figure 2:
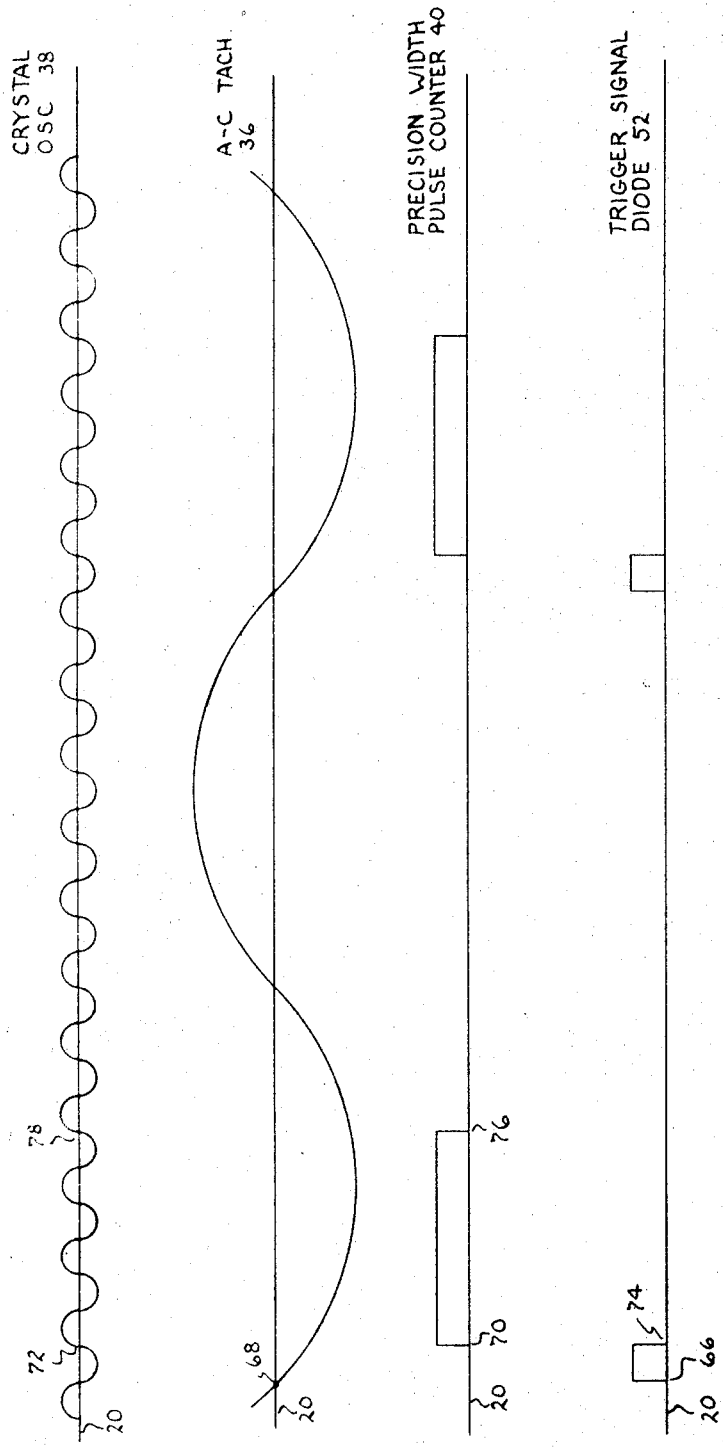
FIG. 2 is a voltage wave diagram showing the voltages occurring at various points in this system.

FIG. 2 shows voltage wave diagrams of the voltages generated by the various portions of the feedback circuit marked on the diagrams. In these diagrams, the reference line for the voltages is the negative potential at the terminal 20 of the regulated voltage supply 16. In the illustrated embodiment of this invention, the trigger signal has begun at the start of a negative going portion of the signal from the tachometer 36, say at a point 66 coinciding with a point 68 on the alternating-current tachometer signal.

The counter circuit 40 responds to a positive going voltage of the periodic signal as it crosses the reference line. Thus, the precision width pulse has not begun until a point 70 on the reference line, coinciding with a point 72 on the periodic signal. Simultaneously, the trigger pulse is terminated at a point 74 when the controlled rectifier 54 is turned on. The precision width pulse is terminated at a point 76 coinciding with a point 78 on the periodic signal. The precision width pulse has a duration equal to three cycles of the periodic signal. This pulse is coupled through the output stage and acquires a constant volage height from the pulse height control circuit 42. The resulting constant height, precision width pulse is used as a measurement of the speed of the motor 10 as the pulse is averaged over the entire alternating-current cycle by the time constants of the remaining portion of the adjustable speed motor drive system.

This invention is not limited to the exact details shown in the illustrated embodiment. Rather, it is intended that the appended claims define the scope and breadth of this invention.

What we claim as new and desire to secure by Letters Patent of the United States is:

1. In a speed regulated motor drive system comprising motor means, a reference signal source for providing a speed reference signal having an average voltage level proportional to a desired speed of said motor means, a feedback circuit for providing a feedback signal having an average voltage level proportional to the actual speed of said motor means, and means for varying the energization of said motor means as a function of the difference between the average voltage levels of the speed reference signal and the feedback signal, the improvement wherein said feedback circuit includes means for providing a series of precision width pulses comprising, in combination:

(a) A stable frequency source for generating a train of periodic signals;
(b) First means for providing alternating-current signals having a frequency proportional to the actual speed of said motor means, the duration of each cycle of the alternating-current signals being at least equal to the duration of a predetermined number of cycles of the periodic signals;
(c) Second means responsive to said first means for providing a trigger signal during each cycle of the alternating-current signals;
(d) Counter circuit means coupled to said second means and to said stable frequency source for providing a precision width pulse having a duration equal to the length of the predetermined number of cycles of the periodic signals in response to each trigger signal; and
(e) Third means coupled to said second means for terminating the trigger pulse upon the occurrence of the precision width pulse.

2. A speed regulated motor drive system according to claim 1 wherein the duration of each cycle of the alternating-current signals is at least equal to the duration of one more than the predetermined number of cycles of the periodic signals.

3. A speed regulated motor drive system according to claim 1 wherein said stable frequency source comprises a crystal oscillator.

References Cited

UNITED STATES PATENTS

| | | | |
|---|---|---|---|
| 2,996,649 | 8/1961 | Leslie | 318—328 X |
| 3,084,307 | 4/1963 | Landis | 318—328 X |
| 3,110,853 | 11/1963 | Jones | 318—328 X |
| 3,378,745 | 4/1968 | James | 318—331 |
| 3,349,309 | 10/1967 | Dannettell | 318—341 |

ORIS L. RADER, Primary Examiner

EZRA SUTTON, Assistant Examiner

U.S. Cl. X.R.

318—341